March 2, 1954  C. E. MILLER  2,670,525
SHAPING ATTACHMENT FOR LATHES
Filed Oct. 29, 1948  2 Sheets-Sheet 1
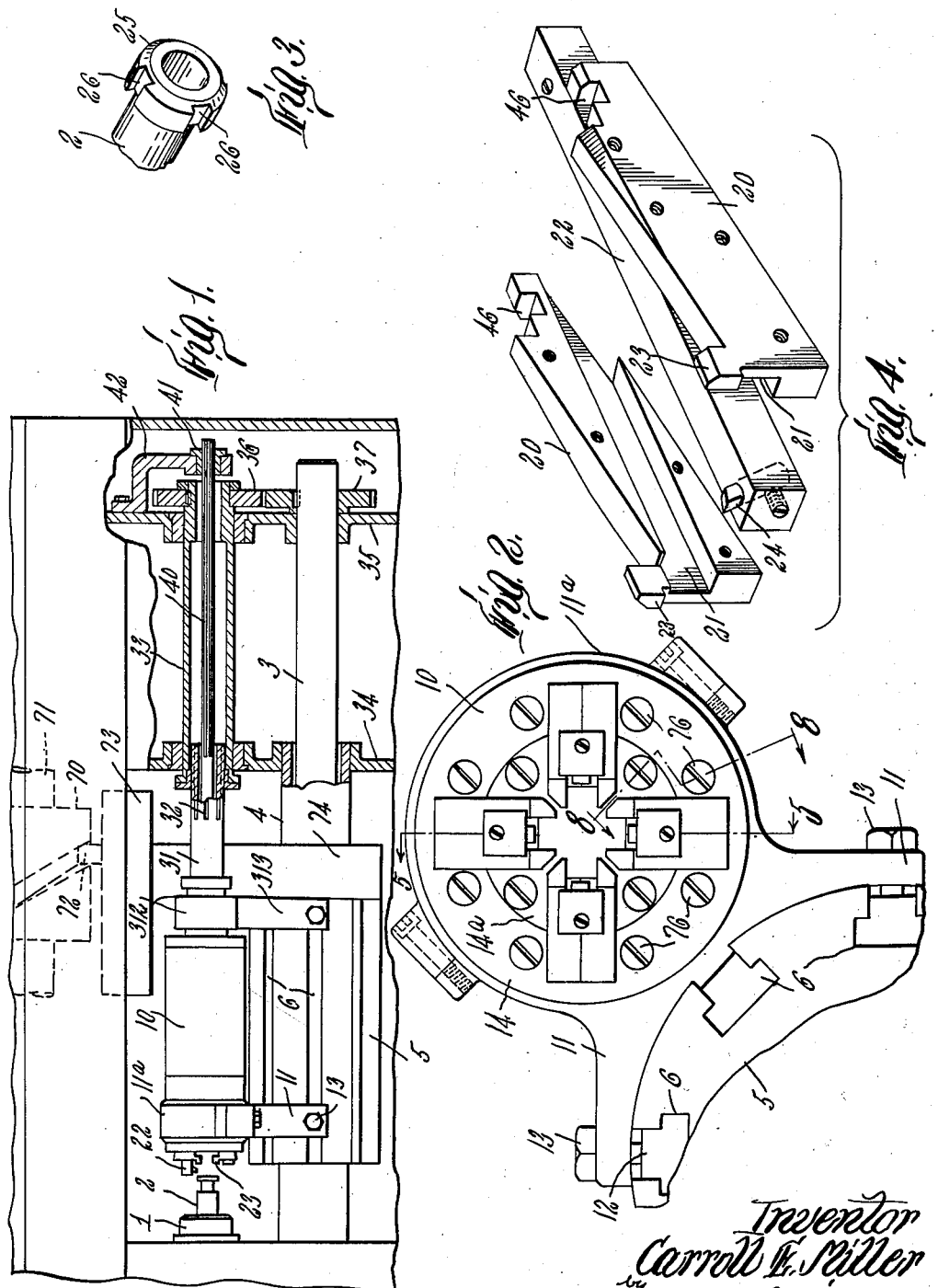

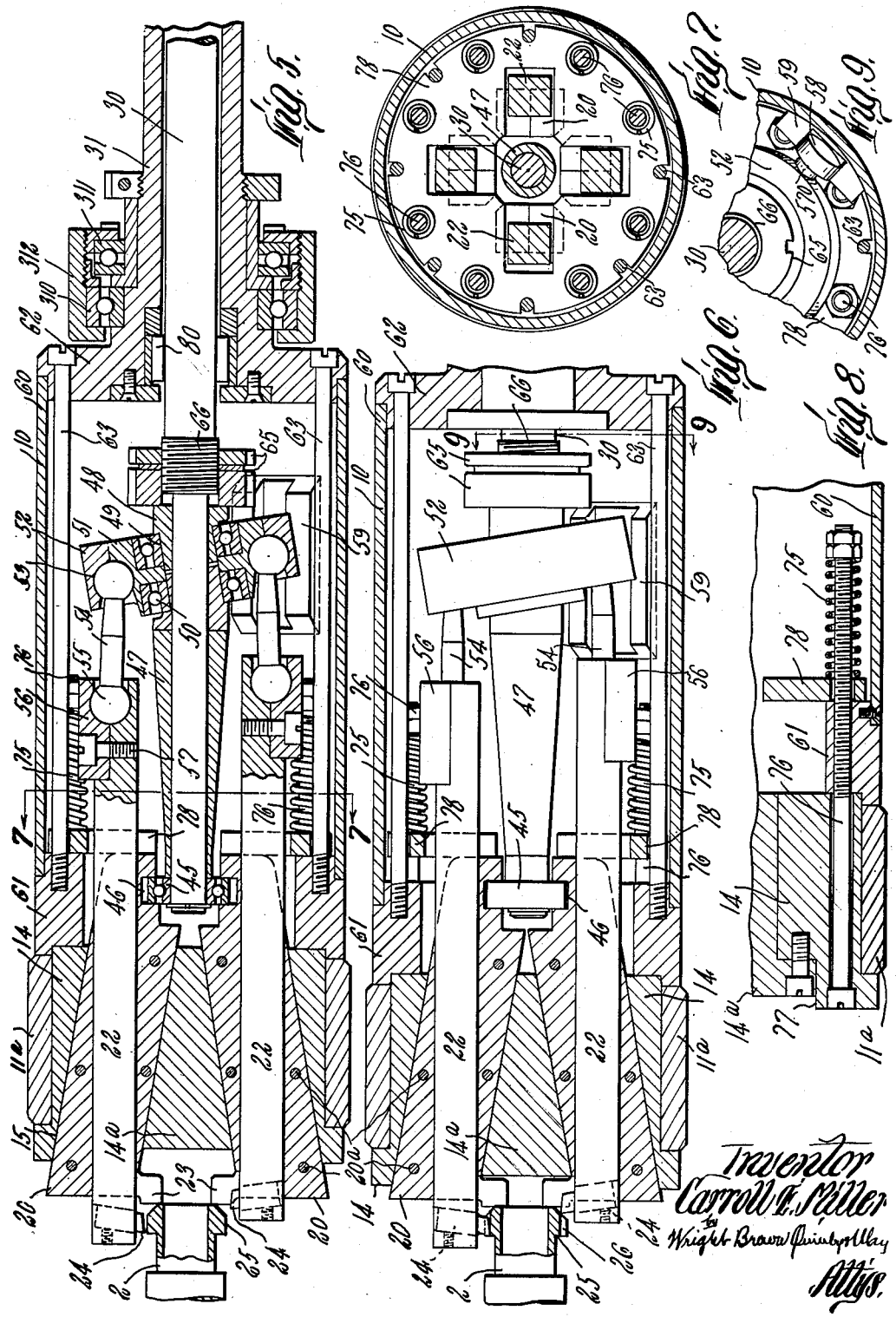

Patented Mar. 2, 1954

2,670,525

UNITED STATES PATENT OFFICE 2,670,525

SHAPING ATTACHMENT FOR LATHES

Carroll E. Miller, Windsor, Vt., assignor to Cone Automatic Machine Company Inc., Windsor, Vt., a corporation of Vermont Application October 29, 1948, Serial No. 57,187

8 Claims. (Cl. 29—57)

This invention has for an object to provide an attachment for lathes, and more particularly for lathes having a plurality of rotary work-carrying spindles, and by which axially arranged grooves or notches may be cut in a rotating work piece. Such an attachment may be used, for example, to cut slots in the sides of bearing lock nuts for the reception of the jaws of a spanner wrench, and the invention will be further described with particular reference to such work, though it will be evident that the attachment is not limited thereto.

Referring to the accompanying drawings,

Figure 1 is a fragmentary view partly in front elevation and partly broken away and in section of a multiple spindle lathe showing an attachment embodying the invention in place thereon.

Figure 2 is a front elevation to a larger scale of the attachment and a portion of the tool-carrying turret to which it is attached.

Figure 3 is a perspective view of the forward end portion of a work piece showing the operation performed by the attachment.

Figure 4 is an exploded perspective view of one of the shaping tool bars and the guide members between which the tool bar is slidably guided.

Figure 5 is a longitudinal sectional view on line 5—5 of Figure 2 showing the attachment about to start into operation.

Figure 6 is a view similar to Figure 5, but showing the operation nearly completed and with certain parts shown in elevation.

Figure 7 is a sectional view on line 7—7 of Figure 5.

Figure 8 is a detail sectional view on line 8—8 of Figure 2.

Figure 9 is a detail sectional view on line 9—9 of Figure 6.

Referring first to Figure 1, at 1 is shown the forward end of a rotatable spindle from which the work piece 2 may project in position for tooling operations to be performed thereon. This spindle may be one of a plurality of spindles of a multiple spindle lathe in which the several spindles are carried by an indexing holder so as to be presented successively into each tooling position. Coaxial with the spindle carrier is a shaft 3 and coaxial with the shaft 3 is a sleeve 4 on which is axially movable a tool-carrying turret 5. This turret may be provided with T slots such as 6 extending longitudinally of its periphery to facilitate attachment thereto of tool holders of various types carrying tools for performing machining operations on the projecting ends of work pieces carried by the several spindles in their various index positions.

The present invention is concerned with one index station only, and for this station there is positioned a support 10 shown as cylindrical in outline and held by a two-part bearing ring 11a provided with a pair of wing feet 11, the end portions of which may be secured in two of the T slots 6 as by the T nuts 12 and bolts 13. This support 10 is arranged coaxial with relation to a work spindle at one of its indexing stations. The support 10 is provided with an inner two-part end closure 14, 14a provided with a plurality of polygonal openings 15 therethrough which are inclined to the axis of the support, being shown as arranged to extend rearwardly and inclined toward the central axis of the support.

These openings form guideways for the reception of pairs of guide members 20 shown detached in Figure 4. These members 20 are secured together in pairs by screws 20a and have diagonally arranged oppositely disposed slots 21 in their confronting faces which together form guideways for rectangular tool bars 22. As shown four such tool bars and sets of guide members are employed, but there may be more or fewer depending upon the number of slots or grooves which it is desired to cut in work. Each of the guide members 20 has at its forward or inner end a nose portion 23 positioned to engage against the forward end of the work piece 2. Each of the tool bars 22 carries a cutting tool 24 in its forward end, the several cutting tools, as shown, being arranged to extend toward the axis of the work piece.

It will be noted that the tool bars 22 are arranged to move axially between their guide members 20 substantially parallel to the work axis, while the guide members themselves are mounted for lengthwise motion through the end member 14 inclined to the work axis. As these guide members are moved rearwardly through the wall 14, the tool bars 22 are therefore caused to move inwardly toward the work axis while the individual motions of the tool bars themselves are substantially parallel to this axis. The rearward movement of the guide members is thus relied upon to feed the tools 24 toward the work axis while the tool bars themselves are reciprocated in the guide members in order to cause the tools to traverse lengthwise of the work. As shown in Figures 1 and 3, the forward end of the work piece has been turned to leave an enlarged diameter portion or head 25 at its forward end and this head is to be cut to provide the four spaced slots 26 shown in Figure 3, after which the head may be cut off from the remainder of the stock. Its inner bore may be threaded so that it may serve as a retaining nut for a bearing, while the slots 26 provide spaced engaging parts for a spanner wrench by which the nut may be turned for application or removal.

Coaxial with the holder 10 is a shaft 30 and relative to this shaft the support 10 is rotatable. As shown in Figure 1, the support 10 is provided with a rearward extension 31 which is splined as at 32 in the forward end of a tube 33. The forward portion of this element 31 is provided with supporting and thrust bearings 310 and 311, respectively, held by a ring 312 which is provided with a pair of wing feet 313 secured to the turret 5 similar to the securement of the wing feet 11. The tube 33 is suitably journaled in wall members 34 and 35 of the machine and on its rear end it has keyed thereto a gear 36 which meshes with a gear 37 keyed to the shaft 3. This shaft 3 is a portion of the drive mechanism which rotates the individual work spindles, and the gearing 36 and 37 is so proportioned as to cause the support 10 to be rotated at the same rate and in the same direction as the spindle 1. The shaft 30 is so supported that the support 10 rotates relative thereto. As shown it is arranged to be nonrotatable, its rear end being splined as at 40 and arranged to slide non-rotatably through a bushing 41 carried by a bracket 42 secured to the end wall 35. The relative rotation between the support 10 and this shaft 30 is arranged to actuate the tool mechanism. Should it be desired to actuate the mechanism faster than with the shaft 30 nonrotatable, it may be arranged to be driven in a direction opposite to the rotation of the support 10, or if it is desired that the rate of actuation be lower, it may be rotated in the same direction as but slower than the support 10.

The forward end of the shaft 30 is of reduced diameter and it carries the inner raceway of a ball bearing 45, the outer raceway of which is positioned within slots 46 in the rear ends of the guide members 20, and as these guide members 20 are moved in or out, being nearer to or further from the axis of the rotating support 10, the notches 46 close down or open up from the outer bearing raceways. Rearwardly of the bearing 45, there is positioned a spacer sleeve 47, and rearwardly of this spacer sleeve is a sleeve 48 having a journal portion 49 intermediate to its ends, the axis of which is inclined to the axis of the support 10 and of the shaft 30. Journaled on this portion 49 with the interposed ball bearings 50 is a pair of ring members 51 and 52 which form between them spherical sockets 53 for the rear ends of links 54, the forward ends of which are similarly formed with ball ends 55 rockably seated in sockets between the rear ends of the tool bars 22 and mating cap members 56 which are secured thereto as by screws 57. The rings 51 and 52 are thus arranged in a plane perpendicular to the axis of the journal portion 49 which is inclined to the axis of the shaft 30 and of the supporting casing 10. The outer ring 52 may be formed in four segments, one for each of the sockets 53 held in place by two screws. One of these segments has a stud 570 on which is journaled a roll 58 bearing between two guide fins 59 secured as by welding to the inner face of the casing 10, thus holding the ring members 51 and 52 for rotation with the casing 10 relative to the shaft 30 and the bearing sleeve 48. Under relative rotation between the support 10 and the shaft 30 these rings are caused to wabble, thus to alternately thrust the links 54 forwardly and then rearwardly, thus to reciprocate the tool bars 22. This mechanism is housed within the support 10 which is provided with a tubular shell 60 extending between a forward cylindrical portion 61 inwardly of the end enclosure 14 and a rearward end portion 62, the portions 61 and 62 being secured together by tie bolts 63 extending through the casing. The sleeve member 48 is held in position by a pair of nuts 65 threaded on the portion 66 of the shaft 30 and with an interposed washer.

The support 10 being carried by the tool turret 5 is movable axially of the bar 3 with the toolcarrying turret. This is accompanied by a cam 70 on an overhead cam shaft 71, the cam 70 acting upon a follower 72 in a slide 73 mounted for motion parallel to the work spindle in the upper portion of the machine and having a depending part 74 engaging the rear end of the turret 5.

When this turret 5 is moved forwardly from the position shown in Figure 1 to bring the portions 23 up against the end of the work piece 2, the forward motion of the guide members 20 is stopped, whereupon further forward motion of the turret causes the support 10 to be moved forwardly on the guide members 20 which are thus caused to move inwardly toward the axis of the work, feeding tools 24 inwardly. At the same time the relative rotation between the support 10 and the shaft 30 causes the bars 22 to be reciprocated so that the tools 24 are caused to cut the grooves 26 in the work piece, the work piece and the support 10 rotating together.

When the cut has been made to the desired depth, the tool turret is retracted, permitting the springs 75 surrounding screws 76 (see Figure 8) seated in the outer ring member 77 of the end closure 14, threaded into the ring 61, and extending through holes in a ring 78 which engages the rear ends of the guide members 20, to retract the tools. These springs cause the guide members 20 to move forwardly with respect to the support 10 when the turret starts to retract, thus retracting the tools 24 radially from the work, and when this has been affected to the limit set by the engagement of the ring 78 against the rear end of the member 61, further retracting motion of the tool turret removes the whole mechanism axially from the work piece, retracting the nose elements 23 out of contact therewith so that the work spindle is free to be indexed for later machining operations. By forward motion of the turret the tools are brought toward the work until the parts 23 engage it, whereupon further forward motion of the turret causes the axially reciprocating tools to feed inwardly toward the work axis, the relative rotation between the casing and the shaft 30 acting to cause this reciprocation of the tools.

From the foregoing description of certain embodiments of this invention it should be evident to those skilled in the art that various changes and modifications might be made without departing from the spirit or scope of this invention.

I claim:

1. In combination with a rotary work-carrying spindle, of a support mounted for motion substantially coaxial with said spindle, guide members arranged about said axis and carried by said support for motion relative to said support inclined to said axis, tool bars carried by said guide members for motion relative to said guide members substantially parallel to said axis and for motion with said guide members along said incline toward and from said axis, tools carried by said bars, means for reciprocating said bars in their guide members to cause said tools to move parallel to said axis, and means for moving said guide members relative to said support to cause said tools to feed in or out with respect to said axis during their reciprocation.

2. In combination with a rotary work-carrying spindle, of a support mounted for motion substantially coaxial with said spindle, guide members arranged about said axis and carried by said support and arranged to engage the end of work projecting from said spindle for motion relative to said support inclined to said axis to be moved toward said axis as said support is moved toward the work while said guide members are in engagement with the work, tool bars carried by said guide members for motion relative to said guide members substantially parallel to said axis and for motion with said guide members along said incline toward and from said axis, tools carried by said bars, means operatively connecting said work spindle and support causing said support to rotate with said spindle, means actuated by rotation of said support with the work spindle for reciprocating said bars in their guide members to cause said tools to move parallel to said axis, and means for moving said support toward and from said work.

3. In combination with a rotary work-carrying spindle, of a support mounted for motion substantially coaxial with said spindle, guide members arranged about said axis and carried by said support and arranged to engage the end of work projecting from said spindle for motion relative to said support inclined to said axis to be moved toward said axis as said support is moved toward the work while said guide members are in engagement with the work, tool bars carried by said guide members for motion relative to said guide members substantially parallel to said axis and for motion with said guide members along said incline toward and from said axis, tools carried by said bars, means operatively connecting said work spindle and support causing said support to rotate with said spindle, means actuated by rotation of said support with the work spindle for reciprocating said bars in their guide members to cause said tools to move parallel to said axis, means for moving said support toward and from said work, and spring means for moving said guide means relative to said support in a direction to move said tools away from said axis during a portion of the motion of said support from said work.

4. In combination with a rotary work-carrying spindle, of a support mounted for coaxial rotation and axial motion relative to said spindle, means for rotating said spindle and support in unison, a shaft coaxial with said support and with reference to which said support rotates, a plurality of guide members arranged around said axis and movable in directions inclined to said axis relative to said support and having outer end portions for contact with the end of a work piece projecting from said spindle, spring means pressing said guide members relative to said support toward such work contact to a determined limit, tool bars carried by said guide members for motion substantially parallel to said axis, a journal non-rotatably carried by said shaft and having its journal axis inclined to said spindle axis, a ring rotatably mounted on said journal, links pivotally connecting said ring and tool bars, and means for moving said support while it is rotating parallel to its rotating axis toward and from the work.

5. In combination with a rotary work-carrying spindle, of a support mounted for motion substantially coaxial with said spindle, guide members arranged about said axis and carried by said support and having means for engaging the end of work projecting from said spindle, said guide members having slots therethrough substantially parallel to the axis of said spindle, said support having guide slots arranged inclined to the axis of said spindle, and within which said guide members are slidably guided, tool bars mounted for reciprocation lengthwise of said guide member slots, tools carried by said tool bars, means for reciprocating said tool bars to cause said tools to reciprocate lengthwise of the work, and means for moving said support axially relative to said guide members in one direction to cause said guide members to approach the axis of said spindle to thereby feed said tools toward said axis during their reciprocation.

6. In combination with a rotary work-carrying spindle, of a support mounted for motion substantially coaxial with said spindle, guide members arranged about said axis and carried by said support and having means for engaging the end of work projecting from said spindle, said guide members having slots therethrough substantially parallel to the axis of said spindle, said support having guide slots arranged inclined to the axis of said spindle, and within which said guide members are slidably guided, tool bars mounted for reciprocation lengthwise of said guide member slots, tools carried by said tool bars, means actuated by rotation of said spindle relative to said support for reciprocating said tool bars to cause said tools to reciprocate lengthwise of the work, and means for moving said support axially relative to said guide members in one direction to cause said guide members to approach the axis of said spindle to thereby feed said tools toward said axis during their reciprocation.

7. In combination with a rotary work-carrying spindle, of a support mounted for motion substantially coaxial with said spindle, guide members arranged about said axis and carried by said support and having means for engaging the end of work projecting from said spindle, said guide members having slots therethrough substantially parallel to the axis of said spindle, said support having guide slots arranged inclined to the axis of said spindle, and within which said guide members are slidably guided, tool bars mounted for reciprocation lengthwise of said guide member slots, tools carried by said tool bars, means for reciprocating said tool bars to cause said tools to reciprocate lengthwise of the work, means for moving said support axially relative to said guide members in one direction to cause said guide members to approach the axis of said spindle to thereby feed said tools toward said axis during their reciprocation, and spring means for moving said guide members in the opposite axial direction to move said tool bars away from said axis.

8. In combination with a rotary work spindle, of mechanism arranged coaxially with said spindle and including a tool bar guide, a tool bar slidably guided by said guide substantially parallel to the axis of said work spindle, means supporting said guide in said mechanism for motion toward or from said axis on an incline thereto, said guide having means for engaging the end of work projecting forwardly from said work spindle, a tool carried by said bar, means actuated by rotation of said spindle for reciprocating said bar, and means for moving said supporting means lengthwise of said axis during the reciprocation of said bar to impart upon said tool as it reciprocates, a radial component of feed into the work in accordance with the aforesaid incline.

CARROLL E. MILLER.

References Cited in the file of this patent

UNITED STATES PATENTS

| Number | Name | Date |
|---|---|---|
| 1,465,282 | Norton | Aug. 21, 1923 |
| 1,910,167 | Hunter et al. | May 23, 1933 |
| 2,039,646 | Hoisington et al. | May 5, 1936 |
| 2,442,009 | Kline | May 25, 1948 |

FOREIGN PATENTS

| Number | Country | Date |
|---|---|---|
| 515,723 | Germany | Jan. 10, 1931 |